United States Patent
Kono et al.

[11] Patent Number: 5,099,185
[45] Date of Patent: Mar. 24, 1992

[54] ALTERNATING CURRENT MOTOR CONTROL METHOD

[75] Inventors: Shinichi Kono; Hironobu Takahasi, both of Oshino, Japan

[73] Assignee: Fanuc Ltd, Minamitsuru, Japan

[21] Appl. No.: 598,624

[22] PCT Filed: Feb. 9, 1990

[86] PCT No.: PCT/JP90/00166

§ 371 Date: Oct. 15, 1990

§ 102(e) Date: Oct. 15, 1990

[87] PCT Pub. No.: WO90/09699

PCT Pub. Date: Aug. 23, 1990

[30] Foreign Application Priority Data

Feb. 12, 1989 [JP] Japan .................. 1-32878

[51] Int. Cl.⁵ .................. H02P 5/28; G01P 3/489
[52] U.S. Cl. .................. 318/799; 318/767
[58] Field of Search .................. 318/727, 767, 772, 778, 318/779, 798, 799, 800, 430, 431

[56] References Cited

U.S. PATENT DOCUMENTS

| | | | |
|---|---|---|---|
| 3,763,414 | 10/1973 | Clarke, Jr. | 318/654 X |
| 3,778,833 | 12/1973 | Castrovillo et al. | 318/594 X |
| 3,885,209 | 5/1975 | Lazarus | 318/692 |
| 4,544,873 | 10/1985 | Salihi et al. | 318/801 |
| 4,820,962 | 4/1989 | Millauer | 318/602 |

Primary Examiner—Bentsu Ro
Attorney, Agent, or Firm—Staas & Halsey

[57] ABSTRACT

An alternating current motor control method capable of preventing or reducing variations in motor output torque in a low speed motor operation.

During a low speed operation of a motor (6), a combination of a second pulse coder (PC2) for detecting the rotational position of a motor (6) with high resolution and a second table (T2) storing therein current command determining sinusoidal data with high resolution is selected by a processor, serving as selection means (20) and switches (SW1, SW2), so that sinusoidal data of respective phases are read out from the second table in accordance with a primary phase angle ($\theta$) of the motor, which is determined by an actual motor rotational speed detected in dependence on the number (FP2) of pulses supplied from the second pulse coder, and the drive of the motor is controlled in accordance with current commands of respective phases derived with high resolution on the basis of the sinusoidal data, thereby preventing variations in the motor output torque.

2 Claims, 3 Drawing Sheets

ALTERNATING CURRENT MOTOR CONTROL METHOD

TECHNICAL FIELD

The present invention relates to an alternating current motor control method, which is capable of preventing or reducing variations in motor output torque during a low speed motor operation.

BACKGROUND ART

A control device for an alternating current motor is conventionally known, which has a memory for storing beforehand, in the form of table, current command calculation data for individual rotational angular regions of the motor, and which calculates current commands of individual phases on the basis of the data read out from the memory in accordance with a region to which an actual rotational position of the motor belongs. For example, a vector control device of FIG. 4 for controlling the drive of a three-phase induction motor is known.

In the control device of FIG. 4, the difference between a speed command Vc read out from a program (not shown) by a processor (not shown) for vector control and an actual speed $\omega r$ detected by a single speed detector PC for detecting the actual rotational speed $\omega r$ of the three-phase induction motor 6 is amplified by an amplifier 1, to thereby generate a torque command T. Then, a secondary current command $I_2$ is derived in an element 2 by dividing the torque command T by an exciting magnetic flux command $\Phi$ supplied from an element 8, and a slip frequency $\omega s$ is derived in an element 10 by dividing the product of a proportional constant K2 and the secondary current command $I_2$ by the exciting magnetic flux command $\Phi$. Further, the slip frequency $\omega s$ and the actual speed $\omega r$ are added together by an adder 11, to thereby derive a primary current phase $\theta$, and the exciting magnetic flux command $\Phi$ is divided in an element 9 by a proportional constant K1 to derive an exciting current component $I_0$. Furthermore, in a current operation circuit 3, a primary current command $I_1$ is determined on the basis of the exciting current component $I_0$ and the secondary current command $I_2$.

A three-phase converter 4 has a memory for storing sinusoidal data of individual phases in association with respective angular regions of the primary current phase $\theta$ in the form of table, and determines current commands of respective phases, IU ($=I_1 \times \sin\theta$), IV ($=I_1 \times \sin(\theta - 2\pi/3)$) and IW ($=I_1 \times \sin(\theta - 4\pi/3)$), by multiplying the primary current command $I_1$ by sinusoidal data $\sin\theta$, $\sin(\theta - 2\pi/3)$ and $\sin(\theta - 4\pi/3)$ of respective phases read out from the memory in accordance with the input primary current phase $\theta$. Further, a current controller 5 carries out current control such that the differences between actual currents of respective phases detected by current detectors CTU, CTV and CTW and the respective current commands IU, IV and IW become zero.

Meanwhile, it is also known to use current commands of two phases, which are derived on the basis of sinusoidal data of two phases stored in the memory of the three-phase converter 4, to derive a current command of the remaining one phase.

As described above, in the current control using the sinusoidal data of respective phases determined for the respective angular regions of the primary current phase $\theta$, the sinusoidal data is varied in a stepwise fashion as the primary current phase $\theta$ varies. As a result, the current command of each phase is varied stepwise, causing a torque variation. In particular, a significant torque variation is caused during a low speed operation of the motor.

DISCLOSURE OF THE INVENTION

An object of the present invention is to provide an alternating current motor control method, which is capable of preventing or reducing variations in motor output torque during a low speed motor operation.

An alternating current motor control method according to the present invention comprises the steps of: (a) storing data for determining a first current command beforehand in a manner each corresponding to an associated one of angular regions each having a first angular width; (b) storing data for determining a second current command beforehand in a manner each corresponding to an associated one of angular regions each having a second angular width which is different from the first angular width; (c) detecting a predetermined parameter, associated with an actual motor rotational position, with one of first and second resolutions different from each other in dependence on an actual motor rotational speed; and (d) determining current commands of individual phases of an alternating current motor on the basis of a corresponding one of the first and second current command determining data read out in accordance with the predetermined parameter detected with one of the first and second resolutions.

As described above, according to the present invention, one of the first current command determining data for the respective angular regions each having the first angular width and the second current command determining data for the respective angular regions each having the second angular width is read out in accordance with the predetermined parameter, associated with the actual motor rotational position and detected with one of first and second resolutions different from each other in dependence on the actual motor rotational speed, and the current commands of respective phases of the motor are determined on the basis of the current command determining data thus read. Accordingly, during a low speed operation of the motor, the current command determining data can be updated each time the motor is rotated by a small angular width. As a result, the current commands can be derived with a high resolution, and variations in motor output torque during a low speed motor operation can be prevented or significantly reduced. Further, in a high speed operation, the predetermined parameter relating to the motor rotational position can be detected with a proper resolution, and therefore, stabilized parameter detection can be achieved.

BEST MODE OF CARRYING OUT THE INVENTION

Figure 1:
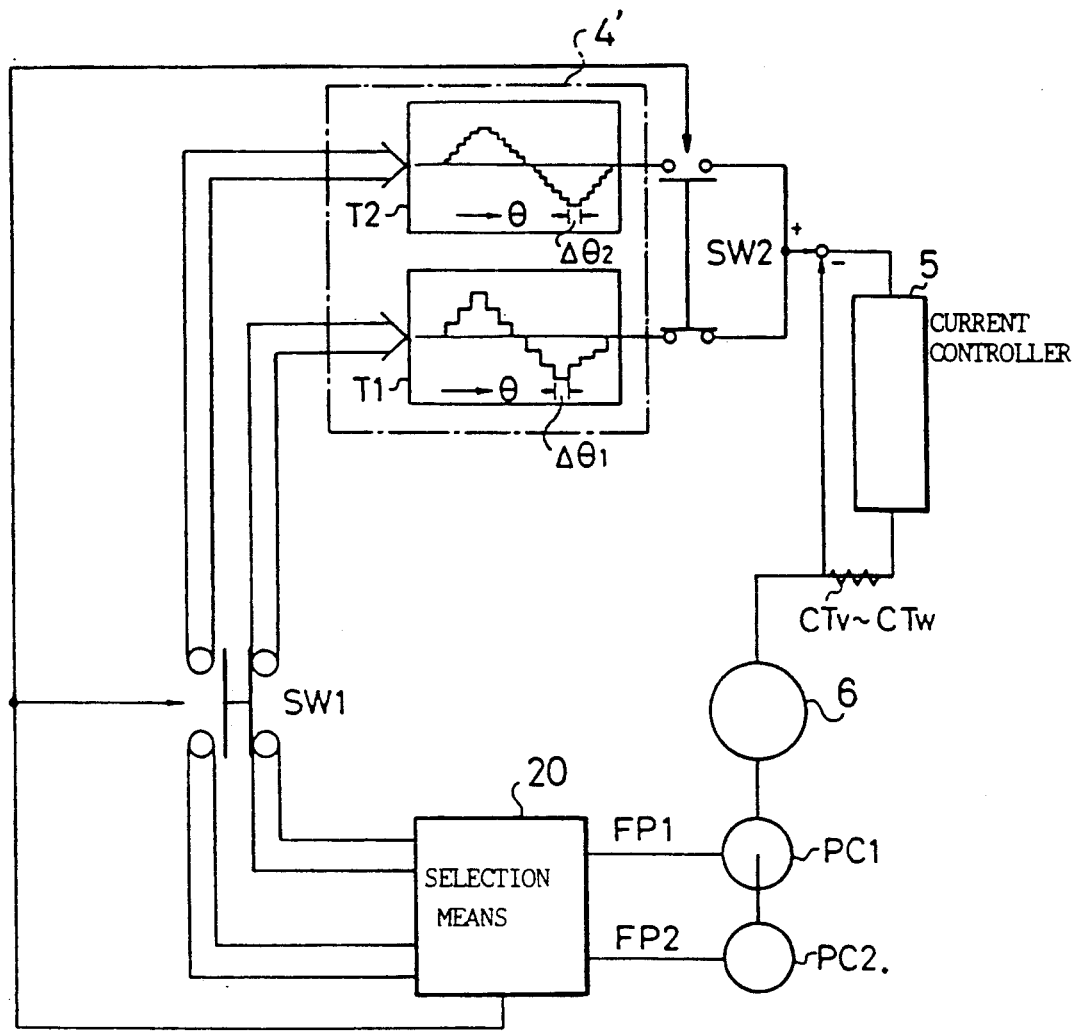
FIG. 1 is a schematic diagram showing, partly in terms of functions, a principal part of a control device to which a control method according to one embodiment of the present invention is applied.
Figure 4:
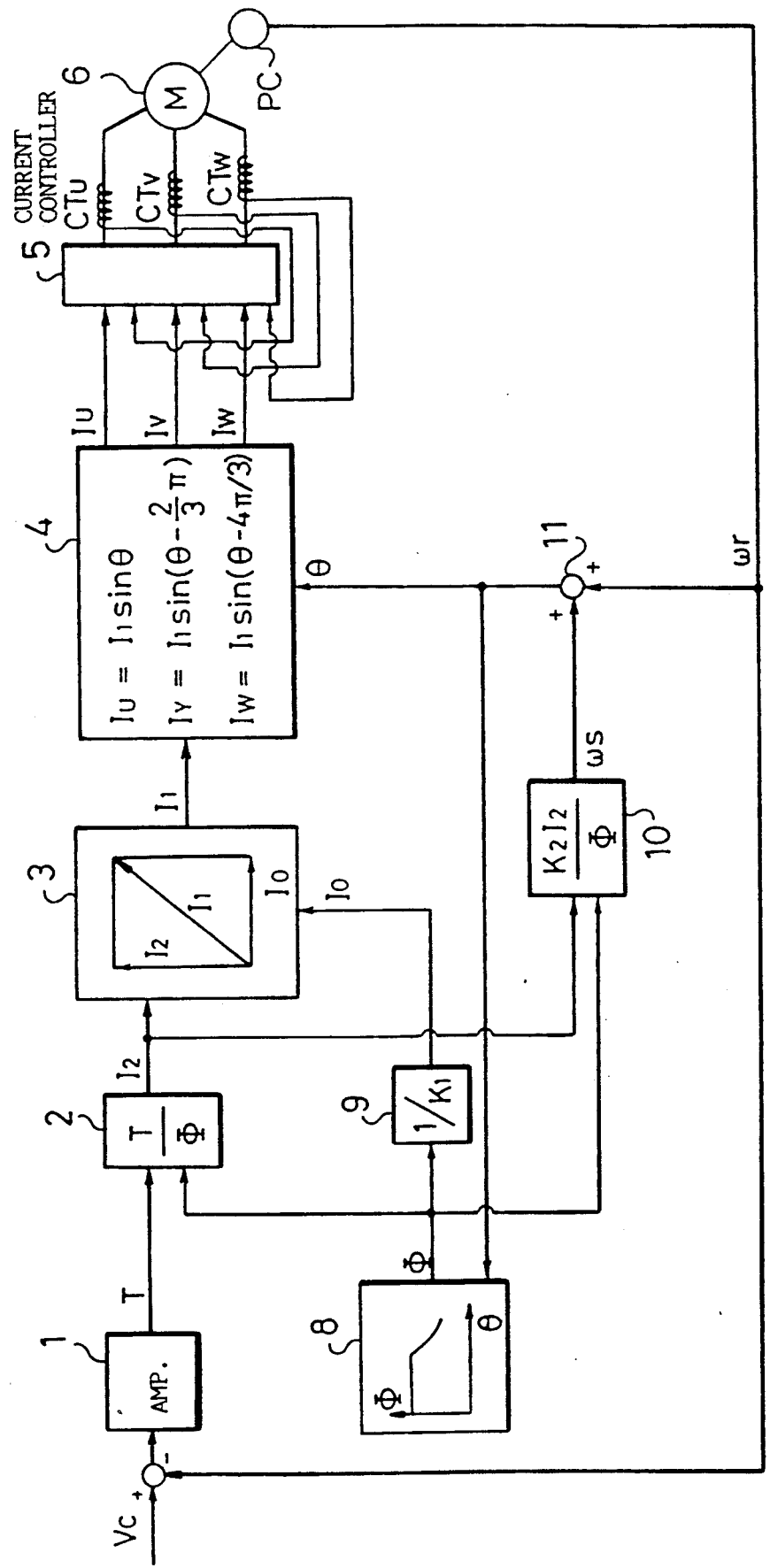
FIG. 4 is a schematic circuit diagram showing a conventional vector control device for a three-phase induction motor.

A control device for embodying an alternating current motor control method of an embodiment of the present invention may be basically the same in construction as the device shown in FIG. 4, and comprises elements (not shown) respectively corresponding to the elements 1 to 3, 8 and 9 in FIG. 4. As shown in FIG. 1, however, the control device of this embodiment comprises first and second position detectors (pulse coders) PC1 and PC2 having different resolutions for position detection. A processor (not shown) of the control device, connected to a memory 4' which includes first and second tables T1 and T2 having different resolutions for current calculation, is designed to perform the functions of switches SW1, SW2, and of the elements 10, 11 in FIG. 4, and cooperate with these switches to achieve the function of selection means 20 for selecting a combination of the first pulse coder PC1 and the first table T1 or a combination of the second pulse coder PC2 and the second table T2.

More specifically, in this embodiment, an optical pulse coder including the first and second pulse coders PC1 and PC2 formed into one piece is used. This pulse coder has first and second slit discs (not shown) mounted on a rotary shaft for rotation in unison therewith, the rotary shaft being coupled to the rotary shaft of the motor 6. The first and second slit discs are respectively formed with first and second slit patterns for detecting the motor rotational position with first and second resolutions (e.g., normal resolution and high resolution). The pulse coder is arranged to generate a first number of pulses or a second number of pulses larger than the first number for every revolution of the motor 6 when the pulse coder functions as the first or second pulse coder PC1 or PC2. Stored in the first and second tables T1 and T2, respectively corresponding to the first and second pulse coders PC1 and PC2, are sinusoidal data of individual phases for respective angular regions of the primary current phase $\theta$ divided by a first angle width $\Delta\theta 1$ and similar data for angular regions divided by a second angle width $\Delta\theta 2$. For example, a total angular region ($\theta = 0$ to 360 degrees) corresponding to one cycle of the primary current is divided by the first angle width into a number A of angular regions in the first table T1, and is divided by the second angle width, which is smaller than the first angle width, into a number B of angular regions in the second table T2 (B is equal to $10 \times A$, for example).

Figure 2:
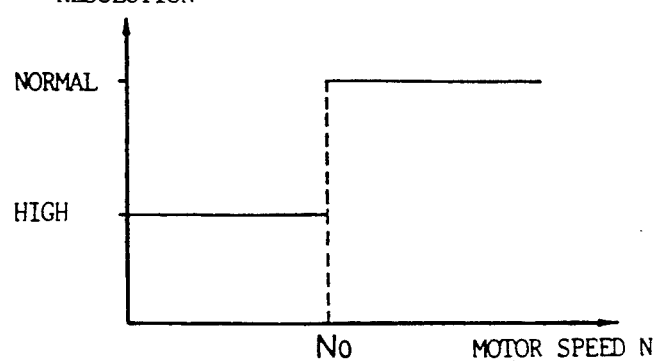
FIG. 2 is a diagram showing a resolution selection in the device of FIG. 1 effected between a low speed motor operation and high speed motor operation for motor rotational speed detection/current command calculation.

Now, the operation of the control device of FIG. 1 will be explained with reference to FIGS. 2 and 3.

Figure 3:
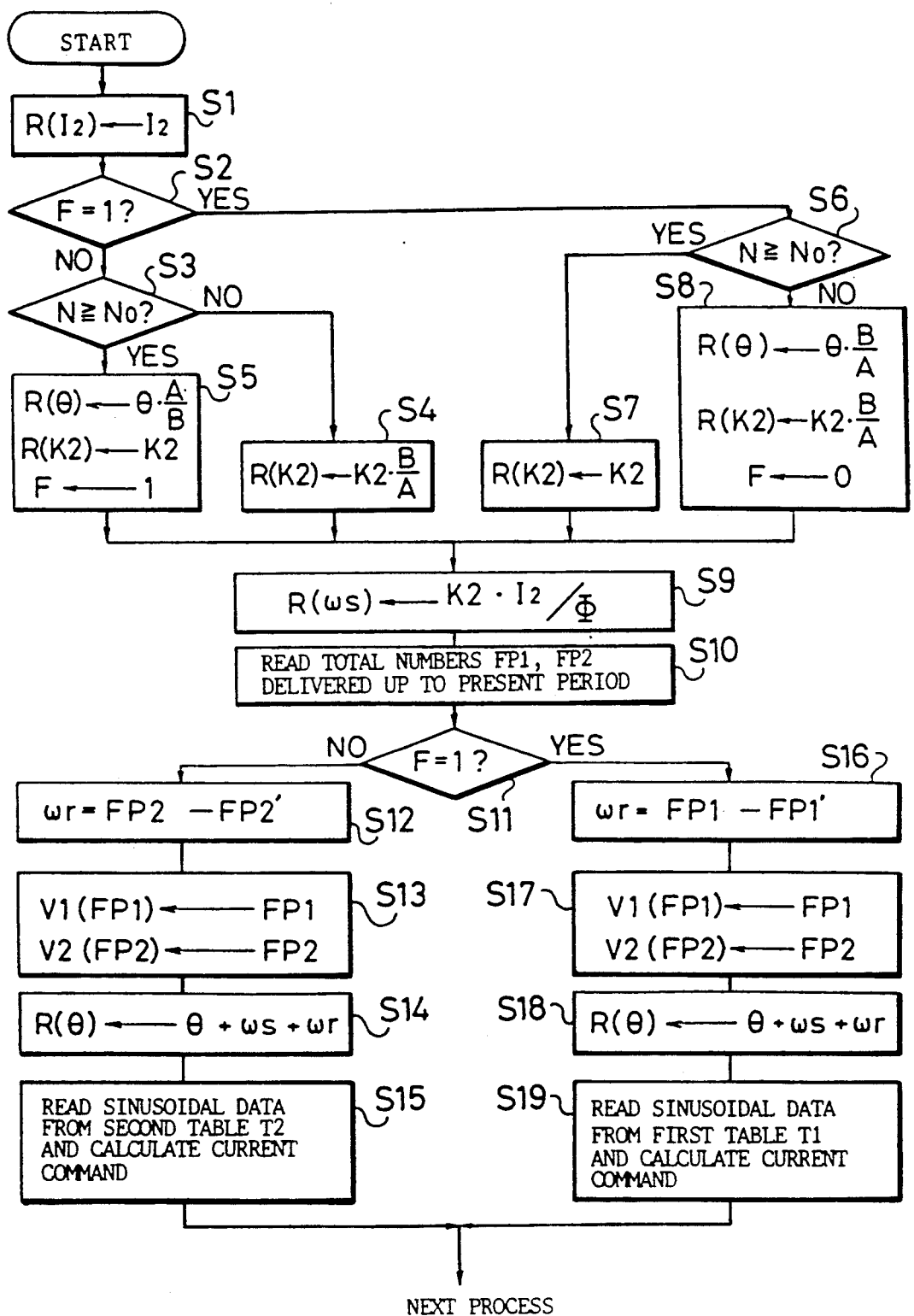
FIG. 3 is a flowchart showing part of software processing in the device of FIG. 1 for calculating current commands in accordance with an actual motor rotational speed.

Upon supply of electric power, a flag register, accommodated in the processor of the control device together with various registers mentioned later, for storing flag information F1 representative of the type of the pulse coder presently used, is initialized to "0", and then a process of FIG. 3 is periodically executed by the processor.

In each process period, the processor first stores a secondary current command $I_2$ derived in the same manner as in the case of FIG. 4, in a register $R(I_2)$ of the processor (step S1), and determines whether or not the flag F1 has its value of "1" indicative of use of the pulse coder PC1 (step S2). Since the result of determination at step S2 effected immediately after the supply of power is negative, step S3 is entered to determine whether the actual motor rotational speed N is equal to or higher than a predetermined rotational speed $N_0$. If the predetermined speed $N_0$ is not reached, the slip constant K2 is multiplied by the ratio B/A between the numbers A and B of angular regions in the first and second tables T1 and T2, whereby the slip constant K2 which is set in accordance with the number A of regions in the first table T1 is converted into a value for use in the second table T2, and the derived value K2·B/A is stored in the register R(K2) as the slip constant K2 (step S4). Next, the processor derives a slip frequency $\omega s$ by dividing a value, which is obtained by multiplication of the secondary current command $I_2$ and the slip constant K2 respectively read out from the registers $R(I_2)$ and R(K2), by an exciting magnetic flux command $\Phi$ obtained in the same manner as in the case of FIG. 4, and then stores the derived value $K2 \cdot I_2/\Phi$ in the register $R(\omega s)$ (step S9).

Subsequently, the processor reads the total numbers of pulses, FP1 and FP2, that were delivered respectively from the first and second pulse coders PC1 and PC2 until the motor 6 reached the rotational position of the present processing period (step S10), and then determines whether or not the value of the flag F is "1" which indicates the use of the first pulse coder PC1 (step S11). If the flag F is not "1", an actual motor rotational speed $\omega r$ is obtained by subtracting the value stored in the register V2(FP2) and representing the total number FP2' of pulses delivered from the second pulse coder PC2 until the motor reached the rotational position of the preceding processing period, from the total number FP2 of pulses read in step S10 (step S12). After this, the total numbers FP1 and FP2 of pulses, read in step S10, are stored respectively in the registers V1(FP1) and V2(FP2) (step S13).

Further, the processor updates the primary current phase angle $\theta$, stored in the register $R(\theta)$ in the preceding period, to the sum $(\theta + \omega s + \omega r)$ of this phase data, and the slip frequency $\omega s$ and the motor rotational speed $\omega r$, respectively derived in steps S9 and S12 (step S14). Then, in accordance with the updated phase angle $\theta$, the processor reads out the sinusoidal data $\sin\theta$, $\sin(\theta - 2\pi/3)$ and $\sin(\theta - 4\pi/3)$ of respective phases, corresponding to the angular region of the primary current phase $\theta$ to which the updated phase angle $\theta$ belongs, from the second table T2. Further, the processor multiplies the primary current command $I_1$, obtained in the same manner as in the case of FIG. 4, by the respective sinusoidal data, to thereby derive the current commands IU, IV and IW of respective phases (step S15). The current controller 5 controls the drive of the motor 6 in accordance with the current commands of respective phases. Thereafter, a sequence of steps S1 to S4 and S9 to S15 is repeatedly executed to control the motor 6 such that the actual motor speed N ($=\omega r$) properly follows the speed command Vc. Moreover, during a low speed operation of the motor, a combination of the second pulse coder PC2 and second table T2 which are of high resolution is used as described above, whereby the sinusoidal data of respective phases are updated every time the motor 6 is rotated by a predetermined small angle. This makes it possible to minutely derive the current commands of respective phases as the motor rotates. As a result, the output torque of the motor 6 varies smoothly.

When the motor speed N becomes higher than or equal to the predetermined speed $N_0$ with an increase in the speed command Vc, the result of determination at step S2 in the processing period immediately after the predetermined speed $N_0$ has been reached is still negative, and thus the use of the second pulse coder PC2 is detected, but the result of determination at step S3 becomes affirmative.

In order to change the operation mode from the low speed operation mode in which a combination of the second pulse coder PC2 and second table T2 is used, to the high speed operation mode in which a combination of the first pulse coder PC1 and first table T1 is used, at first, the processor derives, at step S5, a phase angle $\theta \cdot A/B$ which is used to access the first table T1, by multiplying the ratio $A/B$ by the phase angle $\theta$ which is stored in the register $R(\theta)$ immediately before the predetermined speed $N_0$ is reached (in the preceding processing period) and which is used to access the second table T2. Then, the processor updates the value stored in the resistor $R(\theta)$ to the derived value. Next, the stored value of the register $R(K2)$, corresponding to the slip constant K2 ($=K2\cdot B/A$) used in the calculation of the phase angle for accessing the second table T2, is updated to a slip constant K2 which is to be used in calculating the phase angle for accessing the first table T1. Further, the flag information F1 of "1" representing the use of the first pulse coder PC1 is set into the flag register.

In this case, the determination result of step S11, entered through steps S9 and S10 which follow step S5, becomes affirmative. Thus, the processor derives an actual motor rotational speed $\omega r$, by subtracting the value stored in the register V1(FP1) and representing the total number FP1' of pulses that were delivered from the first pulse coder PC1 until the motor reached the rotational position of the preceding processing period, from the total number FP1 of pulses read in step S10 (step S16). After this, the total numbers FP1 and FP2 of pulses are respectively stored in the registers V1(FP1) and V2(FP2) in step S17 corresponding to step S13. Further, in step S18 corresponding to step S14, the processor updates the phase angle $\theta$ derived in step S5, by using the slip frequency $\omega s$ and motor rotational speed $\omega r$ respectively derived in steps S9 and S16. Then, the processor reads out the sinusoidal data $\sin \theta$, $\sin(\theta - 2\pi/3)$ and $\sin(\theta - 4\pi/3)$ of respective phases, corresponding to the angular region of the primary current phase $\theta$ to which the updated phase angle $\theta$ belongs, from the first table T1 in accordance with the updated phase angle $\theta$, and calculates the current commands, IU, IV and IW of respective phases on the basis of the respective sinusoidal data.

Whereupon, steps S1, S2, S6, S7, S9 to S11 and S16 to S19 are repeatedly executed, during the operation at high speeds higher than the predetermined speed $N_0$, to control the motor 6 such that the actual motor speed N ($=\omega r$) follows the speed command Vc. In this case, as seen from FIG. 2, a combination of the first pulse coder PC1 and first table T1 which are of normal resolution is selected instead of a combination of the second pulse coder PC2 and second table T2 which are of high resolution. As a result, the actual motor speed N ($=\omega r$) is stably detected, and the current commands are derived on the basis of the sinusoidal data of a desired resolution, so that no variations occur in the output torque of the motor 6.

Thereafter, if the motor speed N becomes lower than the predetermined speed $N_0$ with a decrease in the speed command Vc, the process of switching the operation mode from the high speed operation mode to the low speed operation mode is executed in step S8 corresponding to step S5 and preceded by steps S1, S2 and S6, in the immediately succeeding processing period. That is, the phase angle $\theta$ stored in the register $R(\theta)$ in the preceding processing period is updated to the product $\theta \cdot B/A$ of the phase angle and the ratio $B/A$, the slip constant K2 stored in the register $R(K2)$ is updated to the product $K2 \cdot B/A$ of the slip constant and the ratio $B/A$, and the flag information F of "0" representing the use of the second pulse coder PC2 is set into the flag memory. Then, steps S9 to S11 and S12 to S15 are executed.

In subsequent processing periods, a sequence of steps S1 to S4, S9 to S11 and S12 to S15 is repeatedly executed.

The alternating current control method of the present invention is not limited to the foregoing embodiment, and various modifications may be made.

For example, in the above embodiment, the present invention is applied to a three-phase induction motor and a control device of vector control type, but the invention can be also applied to alternating current motors other than the three-phase induction motor and different types of control devices other than the vector control type.

Further, in the above embodiment, a combination of the first pulse coder PC1 and the first table T1 and a combination of the second pulse cooder PC2 and the second table T2 are selectively used, but it is also possible to selectively use one of three or more position detectors (speed detectors) in combination with an associated one of tables which correspond in number to the detectors.

We claim:
1. An alternating current motor control method, comprising the steps of:
   (a) storing data for determining a first current command beforehand in a manner each corresponding to an associated one of angular regions each having a first angular width;
   (b) storing data for determining a second current command beforehand in a manner each corresponding to an associated one of angular regions each having a second angular width different from the first angular width;
   (c) detecting a predetermined parameter, associated with an actual motor rotational position, with one of first and second resolutions different from each other in dependence on an actual motor rotational speed, the predetermined parameter being the actual motor rotational speed; and
   (d) determining current commands of individual phases of an alternating current motor on the basis of a corresponding one of the first and second current command determining data read out in accordance with the predetermined parameter detected by one of first and second detectors, the second current command determining data for the respective angular regions each having the second angular width smaller than the first angular width being stored in said step (b) and the first current command determining data being used when the de- tected actual motor rotational speed is higher than a predetermined speed, and the second current command determining data being used when the actual motor rotational speed is lower than the predetermined speed.

2. A method according to claim 1, wherein sinusoidal data for respective phase angle regions of a primary current of the alternating current motor, as one of the first and second current command determining data, are stored beforehand in each of said steps (a) and (b), each phase angle region having associated one of first and second phase angle widths;

wherein an actual motor rotational speed is detected as the predetermined parameter in said step (c); and wherein said step (d) includes a step (d2) of reading a corresponding one of said sinusoidal data in accordance with the phase angle of the primary current which is determined in dependence on the detected actual motor rotational speed, and a step (d3) of determining the current commands of respective phases on the basis of the readout sinusoidal data.

* * * * *

UNITED STATES PATENT AND TRADEMARK OFFICE
CERTIFICATE OF CORRECTION

PATENT NO. : 5,099,185
DATED : MARCH 24, 1992
INVENTOR(S) : SHINICHI KONO ET AL.

It is certified that error appears in the above-identified patent and that said Letters Patent is hereby corrected as shown below:

On the title page, Item [56] Reference Cited

Col. 2, after line 2, insert the following:

--4,800,325   1/1989   Nakanishi ... 318/661--;

[57] ABSTRACT line 10, "$SW_2$)." should be --SW2).--.

Col. 1, line 51, "$sin\theta-4\pi/3$))," should be --$sin(\theta-4\pi/3)$),--.

Signed and Sealed this

Twenty-fourth Day of August, 1993

Attest:

BRUCE LEHMAN

*Attesting Officer*    *Commissioner of Patents and Trademarks*